United States Patent [19]
Moss et al.

[11] Patent Number: 4,593,998
[45] Date of Patent: Jun. 10, 1986

[54] PHOTOGRAPHIC ENLARGER

[75] Inventors: Brian F. Moss, Chelford; Richard J. Brent, Bramhall, both of England

[73] Assignee: Ciba-Geigy AG, Basel, Switzerland

[21] Appl. No.: 699,389

[22] Filed: Feb. 7, 1985

[30] Foreign Application Priority Data

Feb. 17, 1984 [GB] United Kingdom ............... 8404231

[51] Int. Cl.⁴ ................... G03B 27/52; G03B 13/24; G03B 13/26
[52] U.S. Cl. ........................ 355/21; 354/77; 355/27; 355/44
[58] Field of Search .............. 355/21, 39, 44, 45, 355/72, 74, 27; 354/77

[56] References Cited

U.S. PATENT DOCUMENTS

| | | | |
|---|---|---|---|
| 1,986,693 | 3/1935 | Uher | 95/4.5 |
| 2,231,395 | 2/1941 | Schlegel | 355/21 |
| 2,634,651 | 7/1953 | Kaplowitz | 88/24 |
| 3,644,036 | 6/1972 | Canfield | 355/44 |
| 4,263,000 | 4/1981 | Stemme et al. | 355/27 |
| 4,303,333 | 12/1981 | Mechnick | 355/39 |
| 4,355,889 | 10/1982 | Nelson | 355/39 |

FOREIGN PATENT DOCUMENTS

| | | |
|---|---|---|
| 824597 | 8/1951 | Fed. Rep. of Germany . |
| 2643819 | 7/1977 | Fed. Rep. of Germany . |
| 381258 | 3/1908 | France . |
| 1285424 | 4/1962 | France . |
| 2137368 | 4/1984 | United Kingdom . |

Primary Examiner—Richard A. Wintercorn
Attorney, Agent, or Firm—Harry Falber

[57] ABSTRACT

A daylight enlarger of the enclosed image framing area type is disclosed and comprises a lamp housing with lamp, lens means and holder for a negative, transparency or the like to be enlarged, and a tunnel body. In order to render the enlarger compact for storage purposes, the lamp housing can be stored in the tunnel body, one end of which can be closed by a viewing screen capable of being removably attached to the end of the tunnel body. A developing easel of the dark slide closable type is also provided to receive material on which an enlargement is to be printed. The easel may be removably attached to the said end of the tunnel body for development purposes after the image has been viewed on the screen and is preferably such that it may also be removably attached to the other end of the tunnel for storage purposes.

5 Claims, 5 Drawing Figures

PHOTOGRAPHIC ENLARGER

This invention relates to a photographic enlarger of the enclosed image framing area type which can be used in daylight conditions.

In recent years it has become difficult to prepare in an average house an area which can be blacked-out sufficiently for it to be used as a dark-room in which negatives can be printed on to photosensitive print material. A number of enlargers have been marketed in which the lamphouse and transparency holder are mounted on a box or tent-like structure which encloses the image framing area where the image of the transparency is focussed to compose the picture and expose the print-material. Sometimes provision is made inside the enclosed image framing area to house a processing dish but this means an awkward shaped enclosed area to accommodate such a dish. Alternatively, the enclosed area may have a slot through which the exposed print material may be passed to an adjoining processing dish located outside the enclosed image framing area. However it has proved difficult to render such transfer means light-tight. Moreover, because of the limited space in the enclosed area it has proved difficult to post the exposed print through a slot in the wall of the enclosed area because of the limited freedom of action of an arm in an arm-hole in the walls of the enclosed area Moreover in enclosed image framing enlargers provision has to be made to compose the image of the transparency on the image framing area. This is usually accomplished either by using a movable mirror which in one position directs the light outside the enclosed frame to an operator or by making part at least of the frame of a filter material which allows an operator to view the enlarged image of the enlarging area but which filters out actinic light. This filter method has in practice been found to be difficult especially for beginners and the first method adds considerably to the cost of the enlarger.

DE-OS No. 2 643 819 and U.S. Pat. specification No. 3,644,036 both disclose apparatus for enlarging and printing without a dark-room. In each case the apparatus comprises a base plate with an upright to which an enlarger apparatus effectively comprising a lamp housing and slider holder can be clamped. A body member in the form of a bellows is provided between the enlarger apparatus and the base plate and encloses in a light-tight manner a viewing area which is contained in a tray or like container. The tray can be placed into and out of position at the bottom of the bellows through a side wall of the bottom of the bellows. The bellows in each case is provided at its upper end with a closable viewing aperture so that an image can be viewed through the aperture while the image is being correctly focussed onto the viewing area, whereafter the photosensitive paper can be exposed and developed in the tray or container.

This type of enlarger apparatus is complicated to set up, particularly that of DE-OS No. 2 643 819 which is provided with means to enable the viewing area and tray to be displaceable in all directions on the base plate. Furthermore the apparatus is bulky and awkward to pack up or stow away when not in use.

FR-PS 1 285 424 describes an enlarger which comprises a rigid elongated base carrying at one end a light source, condenser system and slide holder. A solid rear member is located at one end of the base and a front end member with a frame is located at the other end of the base. A protective cover is provided to the base to provide a light-tight enclosure. The frame is shaped to provide a window and a screen of ground glass or the like can be inserted in a gap in the frame so that the image of a slide to be enlarged can be focussed on the screen. A sheet or plate of photosensitive material on which a print is to be made can be placed against the screen inside the enclosure for exposure. This enlarger is also bulky and takes up a lot of room due to its elongated rigid base. Furthermore, the manner in which the protective cover is fixed and the arrangement for introducing the screen or photosensitive material are such that it is very difficult to ensure that the enclosure is light-tight at all times, especially since the protective cover is made of flexible sheet material which fits by simple resilient gripping under longitudinal flanges of the base.

Thus it is an object of the present invention to provide a photographic enlarger of the enclosed image framing area type which is useful for the photo-hobbyist. To this end the enlarger is conveniently one in which the enlarged image in the image framing area can easily be viewed, which comprises means for enabling print material to be exposed and processed in full daylight, and which does not take up a lot of space when not in use.

According to the present invention there is provided a daylight enlarger of the enclosed image framing area type, comprising a lamp housing for receiving a lamp and lens means and having a location to receive a negative, transparency or the like to be enlarged, an enlarger tunnel body attached to the housing, a viewing area and an image framing area for receiving material on which an enlargement is to be printed in which the enlarger tunnel body and the lamp housing are arranged to be detachably connected to one another and the enlarger tunnel body is arranged and dimensioned so as to be capable of containing therein for storage purposes the lamp housing when the latter has been detached from the body, and in which the said viewing area is a viewing screen capable of being removably attached to the end of the tunnel body remote from that to which the lamp housing is attachable, and the image framing area is contained within an easel of the dark slide closable type also capable of being removably attached to said end of the tunnel body in place of the viewing screen.

Preferably, the enlarger tunnel body is divided along its length into two parts which are detachable to permit the lamp housing to be placed in the body and which are connectable in a light-tight manner. The end of the tunnel body to which the lamp housing can be attached is preferably shaped and dimensioned to receive the easel when the lamp housing is contained in the tunnel body for storage purposes. By this means a particularly compact and favourable construction is achieved, with the viewing screen attached at one end of the tunnel body, the easel at the other end and the lamp housing contained within the body and largely protected from dust and dirt by the screen and easel.

In order to enable the invention to be more readily understood reference will now be made to the accompanying drawings, which illustrate diagrammatically and by way of example an embodiment thereof, and in which.

Figure 1:
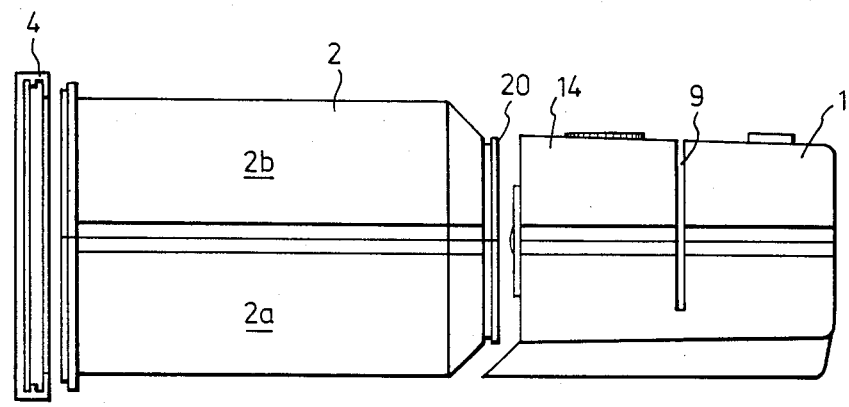
FIG. 1 is an exploded side view of an enlarger.
Figure 2:
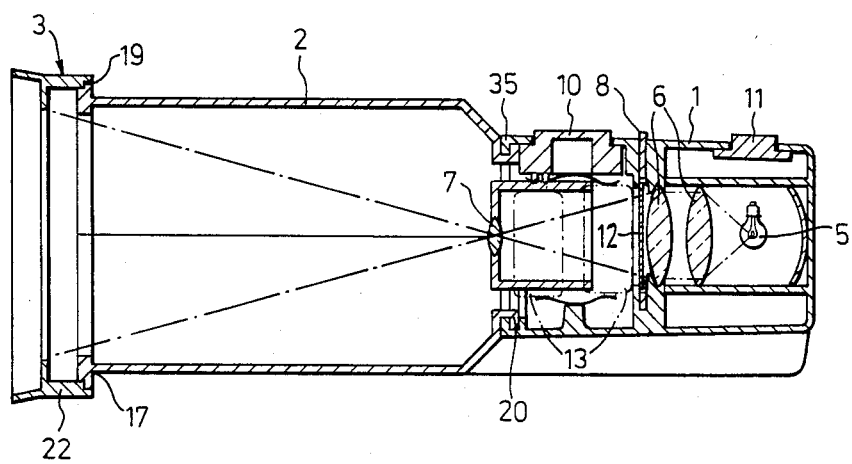
FIG. 2 is a cross-sectional side view of the assembled enlarger of FIG. 1 in operation.

Referring now to FIGS. 1 to 4, there is shown a daylight enlarger of the enclosed image framing area type which comprises a lamp housing 1 which fits onto one end of an enlarger tunnel body 2 which is made of light opaque material. The other end of the tunnel body is closed either by a viewing screen 3 as shown in FIG. 1 or by a developing easel 4 as shown in FIG. 2. The tunnel is shown divided along its length into two identical halves 2a and 2b, the half 2a being shown in FIG. 3.

The lamp housing 1 is a compact lamphouse which as shown in FIG. 2 comprises a lamp 5, two condensers 6, an enlarging lens 7 mounted in a cylindrical adjustment member for focussing purposes, and a transparency or slide holder 8 which can be slid into and out of a slot 9, the slide holder being arranged to close the periphery of the slot 9 in a light-tight manner when inserted in the slot. The lamp housing also has a control knob 10 for moving the lens 7 and an on/off knob 11 arranged to connect the lamp 5 in circuit with an array of batteries 13, indicated in broken lines, the connection not being shown for the sake of clarity.

The upper part 14 of the lamp housing 1 between the slot 9 and the end of the housing adjacent the tunnel body is separate from the remainder of the housing and is held in place by two screws 15. The part 14 can be removed to permit the tunnel body 2 to be connected to and disconnected from the lamp housing 1 in a manner to be described hereinafter.

Figure 3:
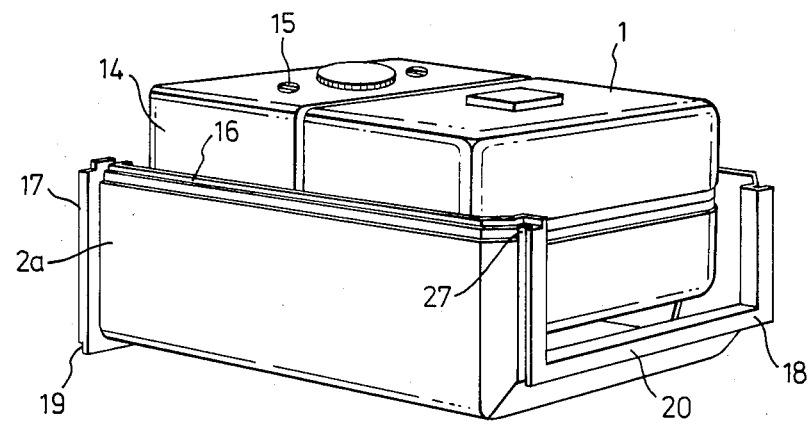
FIG. 3 is a perspective view of the lower half of part of the enlarger with another part placed within it.

The tunnel body 2, as mentioned above, is in two halves and is shaped and dimensioned such that the lamp housing 1 can be placed therein for storage. FIG. 3 shows the tunnel body half 2a with the lamp housing therein ready to be closed by the other tunnel body half 2b. The longitudinal edges 16 of the two halves of the tunnel body are shaped so that when they are placed together they engage in overlapping relation to provide a light-tight join. At each end, the two halves are formed with rectangular reinforcements 17 at one end and 18 at the other. The reinforcement 17 at one end of the tunnel body formed when the two halves 2a and 2b are joined together form a rectangular window the upper and lower edges of which are formed with a rabbet 19. Likewise the reinforcements 18 at the other end of the tunnel body form a rectangular window bounded by a flange 20 thereby forming a groove 21.

The viewing screen 3 comprises a rectangular frame 22 surrounding a ground glass screen 23. The frame 22 is formed with a rabbet for mating with the rabbet 19 on the end of the tunnel body so that the frame can be slid into and out of a position where the ground glass screen lies at the end of the tunnel body.

Figure 4:
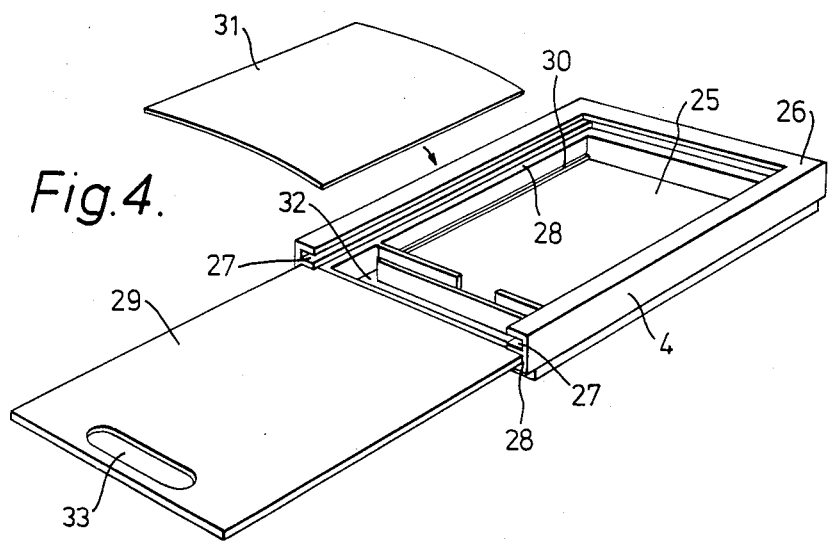
FIG. 4 is a perspective view of a removable easel for holding a print.

The developing easel 4 is of the dark slide closable type and is shown in FIG. 4. The easel comprises a flat base 25 bounded on three sides by a raised surround 26. The longer edges of the surround 26 are each formed with two inwardly facing grooves 27 and 28 and a dark slide 29 made of actinic light opaque material is slidable in the groove 28 so as to cover the base 25 in a light-tight manner. The surround 26 has at each inner side adjacent the base 25 a projecting rib 30 for holding in place on the base 25 a piece 31 of photographic print material on which an enlargement is to be developed.

As will be seen from FIG. 4, the easel is effectively closed at one end and open at the other to permit the slide to be opened and closed. At the open end is a light-baffled passage 32 communicating with the region of the base intended to receive the print material 31. The dark slide 29 is formed with a hole 33, which, when the slide 29 is in the closed position, communicated with the passage 32.

The easel 4 is so shaped and dimensioned that it can be slid along the edge of the tunnel body with its groove 27 engaged by the rabbets 19 so that the tunnel body can be closed either by the viewing screen 3 or the easel 4. Furthermore, it is desirable for the easel 4 to be capable of being slid over the other end of the tunnel body when the enlarger is packed away for storage and in this case the flange 20 will engage in the groove 27.

In the operation of the enlarger just described, a transparency 12 of which an enlargement is to be made is placed in the slide holder 8 which is then slid into position in the slot 9. The viewing screen 3 is placed on the end of the tunnel body 2 as shown in FIG. 2 and the lamp 5 is switched on by pressing the knob 11. The light path is indicated by the broken lines in FIG. 2 and an enlarged image of the transparency will be visible to the operator on the ground glass screen 23. Although the enlarger is of the fixed enlargement type, fine focus of the image may be required and can be obtained by turning the knob 10 to move the lens 7 towards and away from the condenser.

When the operator is satisfied with the presentation of the enlarged image on the screen, the lamp 5 is switched off and the viewing screen 3 is removed.

In a dark room, a piece 31 of photographic print material is placed on the base 25 of the easel 4 and held on the base by engaging under the ribs 30. The dark slide 29 is then slid over the print material and the easel can then be taken into the daylight.

The easel is then slid into place on the end of the tunnel body in the place of the viewing screen 3. The dark slide is pulled out to the position shown in FIG. 4 and the lamp 5 is switched for the required time. The print material is thus exposed to the image and the dimensions of the easel and the screen are such that when the easel is in position on the tunnel body the print material lies in the plane to which the image had been focussed in the viewing screen.

When the print material has been exposed for the correct length of time, the lamp 5 is switched off and the dark slide 29 is then slid back into the easel to shield the print material from the light, whereupon the easel 4 is removed from the end of the tunnel body 2. Development of the print material can now be effected by pouring developing solution into the easel through the hole 33, the solution flowing through the light baffled passage 32 and into contact with the print material. Preferably the developing solution is a monobath which develops the latent image in the print material and fixed out the unexposed silver halide. Thus development can take place in daylight as the easel is actinic light proof. Furthermore, the dark slide 29 is preferably made of a red filter material which cuts out light to which the print material is sensitive, so that the development of the image can be viewed in daylight whilst it is occurring under the effect of the developing solution.

If, however, a monobath developing and fixing solution is not used, a latent image may be developed by pouring developing solution into the easel. After development of the latent image, the solution is poured off through the hole 33 and fixing solution is then poured into the easel.

In each case, the finished enlargement is removed from the easel, which may be then washed and dried for storage.

In order to store the enlarger, when not in use, in a minimum of space, as is most desirable for photo-hobbyists who are unable to set aside a room in the average house or apartment for use only for photographic purposes, the enlarger of the present invention is constructed to be capable of being dismantled and reassembled in a small space. To this end, the screws 15 are undone, releasing the upper part 14 of the lamp housing 1. As shown in FIG. 2, the upper part 14 of the housing has an inturned flange 35 engaging in the groove 21, so that release of the part 14 enables the tunnel body to be detached from the remainder of the housing 1. The tunnel body is then separated into the two halves 2a and 2b and the lamp housing 1 is placed inside the half 2a as shown in FIG. 2 after the part 14 and the screws 15 have been replaced. The top half 2b of the tunnel body is then put in place and the viewing screen is placed in position over the flange 17 as shown in FIG. 2 while the developing easel 4 is placed over the other flange 18 to provide a compact space-saving arrangement.

Figure 5:
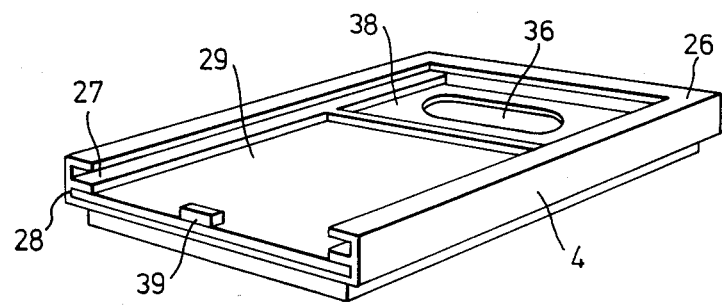
FIG. 5 is a perspective view of a modification of the easel shown in FIG. 4.

A modified form of developing easel is shown in FIG. 5 and is similar to that shown in FIG. 4; accordingly, the same parts have the same reference numerals. In the easel shown in FIG. 5, the hole 36 through which the developing solution can be poured is not formed in the dark slide 32 itself but in a fixed plate 38. The dark slide has a knob 39 by means of which it can be slid in the groove 28.

It will be appreciated that many other modifications of the enlarger just described may be made, particularly as regards the manner in which the tunnel body may be opened up to receive the lamp housing and the manner in which the lamp housing may be attached to the tunnel body. For example, the tunnel body may have one part longitudinally hinged to another and the lamp housing may be arranged and constructed so that it can be slid on to the end of the tunnel body in the same manner as the developing easel, in each case, of course, it being ensured that a light-tight join is achieved.

We claim:

1. A daylight enlarger of the enclosed image framing area type, comprising a lamp housing for receiving a lamp and lens means and having a location to receive a negative, transparency or the like to be enlarged, an enlarger tunnel body attached to the housing, a viewing area and an image framing area for receiving material on which an enlargement is to be printed; said enlarger tunnel body and the lamp housing being detachably connected to one another with the enlarger tunnel body being divided along its length into two parts which are connectable in a light-tight manner and which are detachable so that said body is capable of containing therein for storage purposes the lamp housing when the latter has been detached from the body; said viewing area being a viewing screen capable of being removably attached to the end of the tunnel body remote from that to which the lamp housing is attachable; and said image framing area being contained within an easel of the dark slide closable type also capable of being removably attached to said end of the tunnel body in place of the viewing screen.

2. An enlarger as claimed in claim 1, wherein the end of the tunnel body to which the lamp housing is attached is shaped and dimensioned to receive the easel when the lamp housing is contained in the tunnel body for storage purposes.

3. An enlarger as claimed in claim 1, wherein the lamp housing contains a lamp bulb and means for receiving and connecting in circuit with said bulb, one or more batteries for powering the bulb.

4. An enlarger as claimed in claim 1, wherein the easel has a dark slide formed of red filter material.

5. An enlarger as claimed in claim 1, wherein the dark slide has a planar image framing area to receive material on which an enlargement is to be printed, an entry aperture and a conduit leading from said entry aperture to said viewing area, whereby developing liquid may be poured through said aperture on to said viewing area without moving the slide.

* * * * *